United States Patent
Park

(10) Patent No.: US 8,781,662 B2
(45) Date of Patent: Jul. 15, 2014

(54) TORQUE CONTROL METHOD FOR HYBRID VEHICLE AND SYSTEM THEREOF

(75) Inventor: Joonyoung Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 13/557,598

(22) Filed: Jul. 25, 2012

(65) Prior Publication Data

US 2013/0151045 A1  Jun. 13, 2013

(30) Foreign Application Priority Data

Dec. 8, 2011 (KR) .................. 10-2011-0131196

(51) Int. Cl.
*G06F 17/00* (2006.01)
*G06F 7/00* (2006.01)

(52) U.S. Cl.
USPC .............................. 701/22; 701/36

(58) Field of Classification Search
USPC .................... 701/22, 36; 290/408
See application file for complete search history.

(56) References Cited

U.S. PATENT DOCUMENTS 7,906,863 B2 * 3/2011 Yaguchi ............... 290/40 B

FOREIGN PATENT DOCUMENTS

| JP | 2006256607 A | 9/2006 |
|---|---|---|
| JP | 2010188937 A | 9/2010 |
| KR | 10-2009-0000009 | 1/2009 |
| KR | 10-0904258 | 6/2009 |

\* cited by examiner

*Primary Examiner* — Fadey Jabr
*Assistant Examiner* — Aaron L Troost
(74) *Attorney, Agent, or Firm* — Edwards Wildman Palmer LLP; Peter F. Corless

(57) ABSTRACT

A torque control system and method for a hybrid vehicle. More specifically, an optimal torque at a driving point of an engine, a maximum torque at a steady state of the engine, optimal torques at a driving point of two motor/generators and maximum torques at a steady state of the two motor/generators are input into a control unit. Then each reduction torque ratio of the engine and two the motor/generators is calculated by the control unit, and a reduction factor based on the reduction torque ratio of the engine and the two motor/generators is determined. Next, each target torque based on the reduction factor and the optimal torques of the engine and the two motor/generators is calculated, and each torque of the engine and motor/generators is controlled according to the each target torque.

12 Claims, 2 Drawing Sheets

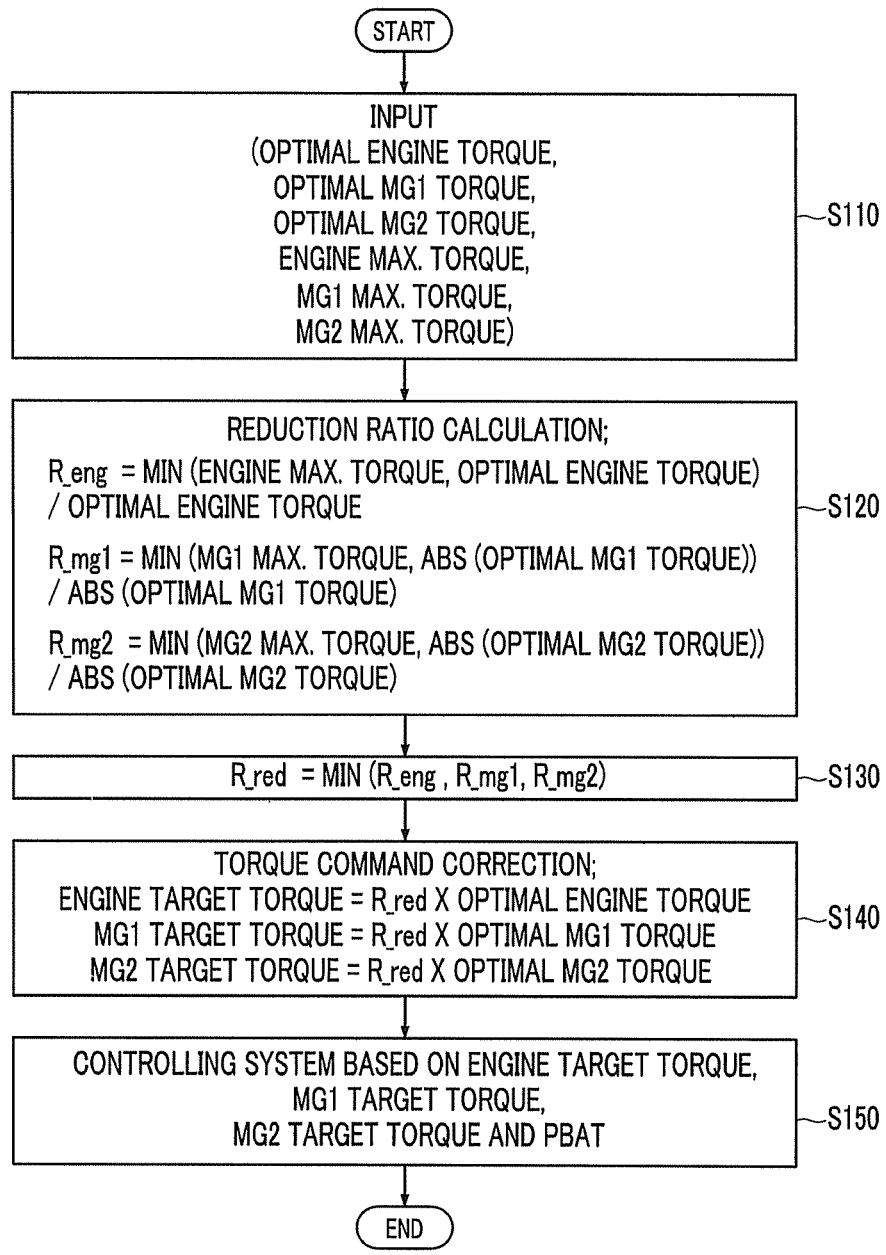

TORQUE CONTROL METHOD FOR HYBRID VEHICLE AND SYSTEM THEREOF

CROSS-REFERENCE TO RELATED APPLICATION

This application claims priority to and the benefit of Korean Patent Application No. 10-2011-0131196 filed in the Korean Intellectual Property Office on Dec. 8, 2011, the entire contents of which are incorporated herein by reference.

BACKGROUND OF THE INVENTION (a) Field of the Invention

The present invention relates to a torque control method for a hybrid vehicle and a system thereof. More particularly, the present invention relates to a torque control method for a hybrid vehicle and a system thereof which may provide simplified method of torque control for motor/generators and an engine.

(b) Description of the Related Art

An environmentally-friendly vehicle (i.e., a green car) typically produces relatively low pollution compared to an internal combustion engine vehicle and thus is capable of realizing a relatively high efficiency. Environmentally-friendly vehicles include hybrid vehicles, plug-in hybrid vehicles, clean diesel vehicles, fuel cell vehicles, electric vehicles and so on.

In particular, a hybrid vehicle (i.e., a hybrid electric vehicle) is a vehicle that has two or more sources of power, for example both gasoline-powered and electric-powered vehicles to provide a more fuel efficient alternative to a single power source vehicle.

The hybrid vehicles may be controlled to produce maximum efficiency of an engine and motor/generators, and may regenerate energy during braking and deceleration of a vehicle by converting kinetic energy to electrical energy and thus enhance fuel consumption efficiency compared to especially conventional internal combustion engine vehicles. Also, hybrid vehicles may, at certain times, be driven without operating an engine especially in a city or congested area so that exhaust emissions may be reduced.

Hybrid vehicles generally include a BMS (Battery Management System) which manages a battery's output, predicts charging and detects the current voltage to maintain optimal battery conditions. Hybrid vehicles also typically include an ECU (engine control unit) which drives an engine and controls output of the engine by controlling an ETC (electric throttle controller) for controlling air intake, a MCU (Motor Control Unit) which outputs torque commands for a motor/generator and controls charging of the battery, a TCU (Torque Control Unit) which controls shift modes and regeneration, and a HCU (Hybrid Control Unit) which communicates with the control units and controls the overall operations of the all of the control units.

Meanwhile, during torque control for a hybrid vehicle, constraints or limitations of an engine and a motor/generator for operating at an optimal driving are variable. For example, constraints of a battery power may be variable according to changes in a SOC (state of charge), battery temperature, battery voltage and so on. Constraints of an engine torque may be variable according to changes of atmospheric temperature, atmospheric pressure or engine malfunction and so on. Constraints of a motor/generator torque may be variable according to changes of motor/generator temperature, inverter input voltage, or motor/generator malfunction and so on. Constraints of engine and motor/generator speed may be variable according to malfunctions of an engine or a motor/generator and so on.

In the conventional torque control method for a hybrid vehicle, optimal correction or compensation is accounted for individually according to various constraint changes of an engine and a motor/generator and as a result the control method becomes very complicated. Additionally, each optimal map data for each condition is input into the system, and as a result, the memory of controller must be increased excessively and still optimal correction or compensation may not be achieved according to constraint changes. Also, management of a battery is conducted separately and thus management of the battery may not be executed simultaneously.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a torque control method for a hybrid vehicle and a system thereof having advantages of providing simplified control method. According to another aspect of the present invention, a torque control method for a hybrid vehicle and a system thereof may control a battery as well as the torque control simultaneously.

A torque control method for a hybrid vehicle that includes an engine, at least two motor/generators as driving sources and a battery for supplying electric power to the motor/generators may include inputting, by a control unit, an optimal torque at a driving point of the engine, a maximum torque at a steady state of the engine, an optimal torque at a driving point of the motor/generators and a maximum torque at a steady state of the motor/generators, calculating, by the control unit, each reduction torque ratio of the engine and the motor/generators, determining, by the control unit, a reduction factor based on the reduction torque ratio of the engine and the motor/generators, calculating, by the control unit, each target torque based on the reduction factor and the optimal torques of the engine and the motor/generators, and controlling each torque of the engine and motor/generators according to the each target torque.

The reduction factor may be determined as a minimum value of the reduction torque ratios of the engine and the motor/generators. Power of the battery may be determined based on a minimum value of the reduction torque ratios of the engine and the motor/generators. The target torques of the engine and the motor/generators may be determined by multiplying the optimal torque of the engine and the motor/generators at the driving point by the reduction factor of the engine and the motor/generators.

A torque control system for a hybrid vehicle according to an exemplary embodiment of the present invention may include an engine configured to be a driving source for driving a wheel, a first motor/generator which supplies power to the engine to start the engine or is configured to be a driving source for driving one or more wheels of the vehicle, a second motor/generator configured to be an additional driving source for driving the one or more wheels of the vehicle, a battery configured to supply/supplying electric power to the first motor/generator and the second motor/generator, and a control portion configured to control a torque of the engine, the first motor/generator and the second motor/generator.

The control portion may calculate each reduction torque ratio of the engine and the first and the second motor/generators based on an optimal torque at a driving point of the engine, a maximum torque at a steady state of the engine, an optimal torque at a driving point of both the first and the second motor/generator and maximum torques at a steady state of the first and the second motor/generator, calculate a reduction factor based on the each reduction torque ratio, calculate each target torque based on the optimal torques of the engine and the first and second motor/generators and the reduction factor, and control the engine and the first and second motor/generators according to the target torques.

The reduction factor may be determined as a minimum value of the reduction torque ratios of the engine and the first and the second motor/generators. The target torques of the engine and the first and the second motor/generators may be determined by multiplying the optimal torque of the engine and the first and the second motor/generators at the driving point by the reduction factor of the engine and the first and the second motor/generators. Power of the battery may be determined based on a minimum value of the reduction torque ratios of the engine and the first and the second motor/generators.

As described above, according to an exemplary embodiment of the present invention, one torque reduction ratio may be applied to control torque of each driving source and thus torque control of a motor/generator and an engine may be simplified. Using the torque ratio, the power of the battery is controlled and thus stable control of speed and charging or discharging of a battery may be conducted.

BRIEF DESCRIPTION OF THE DRAWINGS

FIG. 2 is a flowchart of a torque control method for a hybrid vehicle according to an exemplary embodiment of the present invention.

DESCRIPTION OF SYMBOLS

Figure 1:
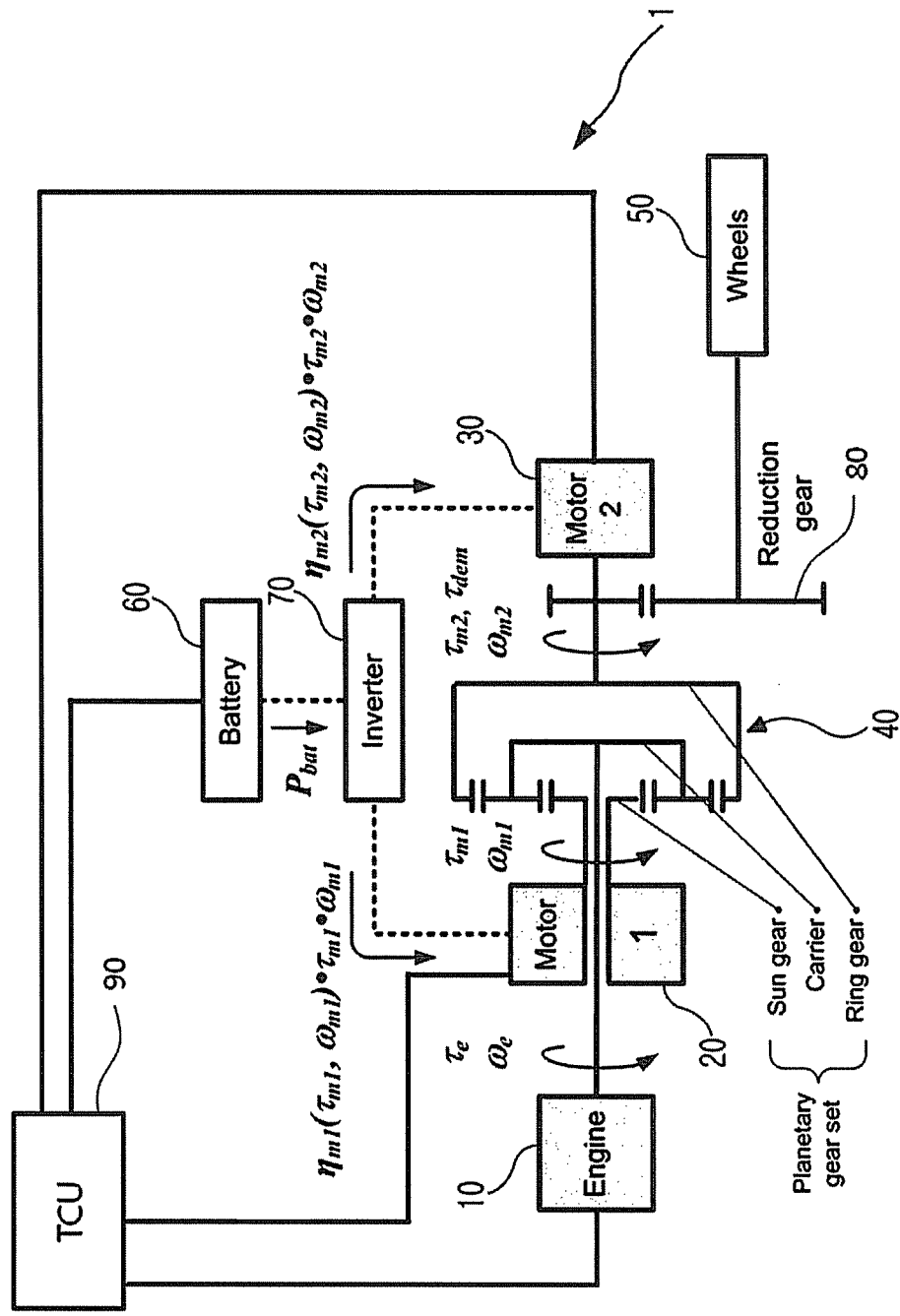
FIG. 1 is a schematic diagram of a hybrid system of which a torque control method for a hybrid vehicle according to an exemplary embodiment of the present invention may be applied thereto.

10: engine
20: first motor/generator
30: second motor/generator
40: planetary gear set
50: wheel
60: battery
70: inverter
80: reduction gear
90: control portion

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a server or a network. Additionally, although the exemplary embodiment is described as using one control unit to perform the above process, it is understood that the above processes may also be performed by a plurality of control units, controllers, processors or the like.

FIG. 1 is a schematic diagram of a hybrid system of which a torque control method for a hybrid vehicle according to an exemplary embodiment of the present invention may be applied thereto. As shown in FIG. 1, a hybrid system of which a torque control method for a hybrid vehicle according to an exemplary embodiment of the present invention may be applied thereto includes a power delivery apparatus 1 and a control portion 90.

The power delivery apparatus 1 includes an engine 10, a first motor/generator 20, a second motor/generator 30, a planetary gear set 40 and a battery 60. The engine 10, the first motor/generator 20 and the second motor/generator 30 of the power delivery apparatus 1 are applied to as driving sources separately or together. A drive shaft of the engine 10 may directly connected with a carrier of the planetary gear set 40.

The first motor/generator 20 may be a starting motor/generator which supplies power to the engine 10 to start the engine 10. A drive shaft of the first motor/generator 20 may be directly connected with a sun gear of the planetary gear set 40.

The second motor/generator 30 may be a drive motor/generator driving one or more wheels 50. A reduction gear 80 may be interposed between the second motor/generator 30 and the wheel 50 for transferring rotation of the second motor/generator 30 to the wheels 50. A drive shaft of the second motor/generator 30 may be connected with a ring gear of the planetary gear set 40. When the second motor/generator 30 is stopped, and the first motor/generator 20 is driven, the ring gear of the planetary gear set 40 stops and the sun gear rotates. Thus, torque from the carrier starts/rotates a crankshaft in the engine 10.

After starting of the engine 10, rotational speeds of the engine 10 and the first motor/generator 20 determine the rotational speed of the ring gear, and the rotation of the ring gear is transferred to the drive shaft of the second motor/generator 30.

The overall scheme of the power delivery apparatus 1 which includes three driving sources 10, 20, and 30 and determines output value transferred to the wheel 50 is towel understood by a person skilled in the art, and thus detailed description will be omitted in the specification. Furthermore, in FIG. 1, one planetary gear set 40 is depicted. However, it is not limited thereto, on the contrary the power delivery apparatus 1 may include one or more than one planetary gear set may be applied.

The battery 60 supplies electric power to the first motor/generator 20 and the second motor/generator 30. The electric power of the battery 60 is supplied to the first motor/generator 20 and the second motor/generator 30 via an inverter 70. The inverter 70 may converter direct current (DC) electric power to alternating current (AC) electric power. Again the functions of the inverter 70 in the power delivery apparatus 1 for a hybrid vehicle are well understood to a person of an ordinary skill in the art, and thus detailed description will be omitted in the specification.

The control portion 90 is configured to control torque of the engine 10, the first motor/generator/generator 20 and the second motor/generator 30 and simultaneously control power supplied from the battery 60. The control portion 90 may be, e.g., a TCU (Torque Control Unit), controlling the torque of the engine 10, the first motor/generator 20 and the second motor/generator 30.

Equations representing the relationship between speed, torque and power of the power delivery apparatus 1 according to an exemplary embodiment of the present invention at a steady state will be described below. In this case, a system in a steady state has numerous properties that are constant. This implies that for any property of the system, the partial derivative with respect to time is zero.

$$\omega_{m1} = (1+R) \cdot \omega_e - R \cdot \omega_{m2} \quad \text{Equation 1}$$

$$\tau_{m1} = -\frac{1}{(1+R)} \cdot \tau_e \quad \text{Equation 2}$$

$$\tau_{dem} = \tau_{m2} + \frac{R}{(1+R)} \cdot \tau_e \quad \text{Equation 3}$$

$$P_{bat} = \eta_{m1}(\tau_{m1}, \omega_{m1}) \cdot \tau_{m1} \cdot \omega_{m1} + \eta_{m2}(\tau_{m2}, \omega_{m2}) \cdot \tau_{m2} \cdot \omega_{m2} \quad \text{Equation 4}$$

In the equations, $\omega_e$ denotes angular speed of the engine 10. $\omega_{m1}$ denotes angular speed of the first motor/generator 20. $\omega_{m2}$ denotes angular speed of the second motor/generator 30 or vehicle speed. $\tau_e$ denotes torque of the engine 10. $\tau_{m1}$ denotes torque of the first motor/generator 20. $\tau_{m2}$ denotes torque of the second motor/generator 30. $\tau_{dem}$ denotes torque demand torque. $\eta_{m1}$ denotes efficiency of the first motor/generator 20. $\eta_{m2}$ denotes efficiency of the second motor/generator 30. R denotes gear ratio of the ring gear to the sun gear. $P_{bat}$ denotes power of the battery 60.

The steady state relationship is four equations with eight variables including two variables with known values. Thus, the steady state relationship has 2 degrees of freedom. The degree of freedom means variable values at a specific condition in a system. The two variables with known value may be, for example, the demand torque $\tau_{dem}$ and the vehicle speed $\omega_{m2}$.

Meanwhile, two variables of the six variables with unknown value may be designated as design variables and the design variables may be stored in a map after optimization according to driving conditions. The two variables to be the design variable may be, for example, the engine speed $\omega_e$ and the battery power $P_{bat}$, or the engine speed $\omega_e$ and the engine torque $\tau_e$, and so on. Utilizing the 2 degrees of freedom, efficient driving point may be determined.

The 8 variables, however, may be variable according to operation conditions of the power delivery apparatus 1. Therefore, the map preferably is compiled as tables for satisfying each operation condition. For example, when the torque of the engine 10 is decreased due to change of atmospheric temperature and so on, correction or compensation of the driving point is preferably conducted. However, for example, when torque correction of the second motor/generator 30 is not conducted, driving torque may be insufficient or overcharge or overdischarge of the battery 60 may occur. Also, when torque correction of the second motor/generator 30 is not appropriate, overdischarge of the battery 60 may occur.

Furthermore, when the torque of the first motor/generator 20 is decreased, reaction force against the engine torque may not be sufficient and thus the engine speed may be excessively increased. In addition, when the engine torque is decreased, overcharge or overdischarge of the battery 60 may occur. For example, when the torque of the second motor/generator 30 is decreased, power unbalance of PE (power electronics; for example a battery, an inverter and so on) may occur, and thus overcharge or overdischarge of the battery 60 may occur. Furthermore, reverse torque of the second motor/generator 30 may occur and thus driving torque may be excessively increased. Thus, correction or compensation of target torques for stably controlling the system corresponding to torque limitation of the driving sources is preferable, particularly excessive driving torque, excessive increases in the engine speed, and reversal of tendency of charging/discharging of a battery should be avoided.

Each above described variable applied to optimization process of driving points may be variable while driving the vehicle, and thus suitable correction of each torque for stably controlling the system may be required. Meanwhile, conventionally, each optimization of three driving sources 10, 20, and 30 is conducted independently, and optimized values for each driving source according to operation conditions of the power delivery apparatus 1 must be obtained from a map.

In the optimization processes for each driving source, the driving point for enhancing system efficiency or minimizing fuel consumption may be determined. The optimized driving point is determined within maximum/minimum torque of each driving source, maximum/minimum speed of each driving source and power limitation of a battery. However, the optimization process may not be conducted in a vehicle controller, and thus optimized data according to each driving condition is stored as a map and used for control purposes. Conventionally, however, memory of the control portion must be excessively increased, and when data in the map is not sufficient, overload may occur in the system.

FIG. 2 is a flowchart of a torque control method for a hybrid vehicle according to an exemplary embodiment of the present invention. The control method for a hybrid vehicle according to an exemplary embodiment of the present invention will be described referring to the hybrid system described in FIG. 1. However, it is not limited thereto. On the contrary, the method may be applied to torque control for other hybrid vehicles with two different driving sources.

As shown in FIG. 2, when torque control for the driving sources 10, 20, and 30 starts, an optimal torque at a driving point of the engine 10, a maximum torque at a steady state of the engine 10, optimal torques at a driving point of the motor/generators 20 and 30 and maximum torques at a steady state of the motor/generators 20 and 30 are input to the control portion 90 at the step S110. Then the control portion 90 calculates each reduction torque ratio of the driving sources 10, 20 and 30 based on the optimal torques and the maximum torques at the step S120, and the control portion 90 draws a minimum reduction torque ratio of the reduction torque ratios at the step S130.

The reduction torque ratio may be a value at which a minimum value of the optimal torque at the driving point and the maximum torque at the steady state is divided by the optimal torque at the driving point. In this case, the driving source with the minimum reduction torque ratio is the driving source with maximum reduction torque value. In the specification, the minimum reduction torque ratio of the reduction torque ratios of the driving sources will be denoted as a reduction factor.

At steps S120 and S130, the absolute value of the optimal torque will be applied to the process. At the step S120, the reduction torque ratios of each driving source 10, 20, and 30 may be calculated as follows. The reduction torque ratio of the engine $$10 = \frac{\min(\tau_{e\_max}, \tau_e)}{\tau_e},$$

The reduction torque ratio of the first motor/generator $$20 = \frac{\min(\tau_{m1\_max}, |\tau_{m1}|)}{|\tau_{m1}|}.$$

The reduction torque ratio of the second motor/generator $$30 = \frac{\min(\tau_{m2\_max}, |\tau_{m2}|)}{|\tau_{m2}|}.$$

The reduction factor can be calculated at the step S130 as follows.

$$R_{reduction} = \min\left(\frac{\min(\tau_{e\_max}, \tau_e)}{\tau_e}, \frac{\min(\tau_{m1\_max}, |\tau_1|)}{|\tau_{m1}|}, \frac{\min(\tau_{m2\_max}, |\tau_{m2}|)}{|\tau_{m2}|}\right) \quad \text{Equation 5}$$

In this case, the "min" means an arithmetic operation for drawing a minimum value of the values within the parenthesis "( )". And then, the control portion 90 reduces the optimal torque of the driving sources 10, 20, and 30 by the minimum reduction torque ratio $R_{reduction}$ to output each target torque at the step S140. That is, new target torques may be determined by multiplying each optimal torque with the minimum reduction torque ratio $R_{reduction}$.

The step S140 can be described as equations as follows.

$$\tau^*_e = \tau_e \cdot R_{reduction}$$

$$\tau^*_e = \tau_e \cdot R_{reduction}$$

$$\tau^*_{m1} = \tau_{m1} \cdot R_{reduction}$$

$$\tau^*_{m1} = \tau_{m1} \cdot R_{reduction}$$

$$\tau^*_{m2} = \tau_{m2} \cdot R_{reduction}$$

$$\tau^*_{m2} = \tau_{m2} \cdot R_{reduction}$$

And thus, $$\tau^*_{m1} = -\frac{1}{(1+R)} \cdot \tau^*_e$$

$$\tau^*_{m1} = -\frac{1}{(1+R)} \cdot \tau^*_e$$

$$\tau^*_{dem} = \tau_{dem} \cdot R_{reduction} = \tau^*_{m2} + \frac{R}{(1+R)} \cdot \tau^*_e$$

$$\tau^*_{dem} = \tau_{dem} \cdot R_{reduction} = \tau^*_{m2} + \frac{R}{(1+R)} \cdot \tau^*_e$$

And then, the control portion 90 control the torque of the engine 10, the first motor/generator 20 and the second motor/generator 30 according to the target torques of the engine 10, the first motor/generator 20 and the second motor/generator 30 at the step S150.

The control portion 90 also may control power from the battery 60 based on the reduction torque ratio $R_{reduction}$. The process for reducing the power of the battery 60 can be described as follows. The $R_{reduction}$ is multiplied to both side of $P_{bat} = \eta_{m1} \cdot \tau_{m1} \cdot \omega_{m1} + \eta_{m2} \cdot \tau_{m2} \cdot \omega_{m2}$ And thus, $$P^*_{bat} = P_{bat} \cdot R_{reduction} = \eta_{m1} \cdot \tau^*_{m1} \cdot \omega_{m1} + \eta_{m2} \cdot \tau^*_{m2} \cdot \omega_{m2}$$

Since, $\eta_{m1}(\tau_{m1}, \omega_{m1}) \approx \eta_{m1}(\tau^*_{m1}, \omega^*_{m1})$ and, $\eta_{m2}(\tau_{m2}, \omega_{m2}) \approx \eta_{m2}(\tau^*_{m2}, \omega^*_{m2})$ As described above, in an exemplary embodiment of the present invention, since all the torques of the driving sources may be reduced using one reduction torque ratio, the torque control for the motor/generator and the engine may be simplified. Additionally, the map data stored in the control portion may be reduced, control delay may be prevented, and malfunction due to excessive data can be prevented.

The torque of each driving source can be managed to be equal or less than the maximum torque at the at steady state, and thus over load of the driving sources, or overcharge or overdischarge of the battery is prevented. Also, excessive increases in the driving torque according to changes of the driving point can be prevented. Since, the battery can be controlled by the reduction torque ratio, and reversal of charging/discharging tendencies of the battery can be avoided.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A torque control method for a hybrid vehicle including an engine and at least two motor/generators as driving sources and a battery for supplying electric power to the motor/generators, the torque control method comprising:
    inputting, by a control unit, an optimal torque at a driving point of the engine, a maximum torque at a steady state of the engine, optimal torques at a driving point of the two motor/generators and maximum torques at a steady state of the two motor/generators;
    calculating, by the control unit, a reduction torque ratio for each of the engine and the two motor/generators;
    determining, by the control unit, a reduction factor based on the reduction torque ratios of the engine and the motor/generators;
    calculating, by the control unit, each target torque of a plurality of target torques based on the reduction factor and the optimal torques of the engine and the two motor/generators; and
    controlling, by the control unit, each torque of the engine and two motor/generators according to the each target torque.

2. The torque control method of claim 1, further comprising determining the reduction factor as a minimum value of the reduction torque ratios of the engine and the two motor/generators.

3. The torque control method of claim 1, further comprising determining power from the battery based on a minimum value of the reduction torque ratios of the engine and the motor/generators.

4. The torque control method of claim 1, further comprising determining the target torques of the engine and the motor/generators by multiplying the optimal torque of the engine and the two motor/generators at the driving point by the reduction factor of the engine and the two motor/generators.

5. A torque control system for a hybrid vehicle comprising:
an engine configured as a driving source for driving one or more wheels;
a first motor/generator configured to supply power to the engine to start the engine or configured as a driving source to provide additional power to the one or more wheels;
a second motor/generator configured to be a driving source to provide additional power to the wheels;
a battery configured to supply electrical power to the first motor/generator and the second motor/generator; and
a control portion configured to control a torque of the engine, the first motor/generator and the second motor/generator,
wherein the control portion calculates a reduction torque ratio for each of the engine and the first and the second motor/generators based on an optimal torque at a driving point of the engine, a maximum torque at a steady state of the engine, optimal torques at a driving point of the first and the second motor/generator and maximum torques at a steady state of the first and the second motor/generator,
calculates a reduction factor based on the reduction torque ratios,
calculates each target torque of a plurality of target torques based on the optimal torques of the engine and the first and second motor/generators and the reduction factor, and
controls the engine and the first and second motor/generators according to the target torques.

6. The torque control system of claim 5, wherein the reduction factor is determined as a minimum value of the reduction torque ratios of the engine and the first and second motor/generators.

7. The torque control system of claim 5, wherein the target torques of the engine and the first and the second motor/generators are determined by multiplying the optimal torque of the engine and the first and the second motor/generators at the driving point by the reduction factor of the engine and the first and the second motor/generators.

8. The torque control system of claim 5, wherein power of the battery is determined based on a minimum value of the reduction torque ratios of the engine and the first and the second motor/generators.

9. A non-transitory computer readable medium containing program instructions executed by a processor or controller in a hybrid vehicle, the computer readable medium comprising:
program instructions that calculate a reduction torque ratio for each of an engine and a first and a second motor/generators based on an optimal torque at a driving point of the engine, a maximum torque at a steady state of the engine, optimal torques at a driving point of the first and the second motor/generator and maximum torques at a steady state of the first and the second motor/generator,
program instructions that calculate a reduction factor based on the reduction torque ratios,
program instructions that calculate each target torque of a plurality of target torques based on the optimal torques of the engine and the first and second motor/generators and the reduction factor, and
program instructions that control a torque of the engine and the first and second motor/generators according to the target torques.

10. The non-transitory computer readable medium of claim 9, wherein the reduction factor is determined as a minimum value of the reduction torque ratios of the engine and the first and the second motor/generators.

11. The non-transitory computer readable medium of claim 9, wherein the target torques of the engine and the first and the second motor/generators are determined by multiplying the optimal torque of the engine and the first and the second motor/generators at the driving point by the reduction factor of the engine and the first and the second motor/generators.

12. The non-transitory computer readable medium of claim 9, wherein power of the battery is determined based on a minimum value of the reduction torque ratios of the engine and the first and the second motor/generators.

* * * * *